July 15, 1958 — O. W. HOSKING — 2,843,154
EXPANSIBLE PLUG FOR PIPES
Filed June 27, 1955
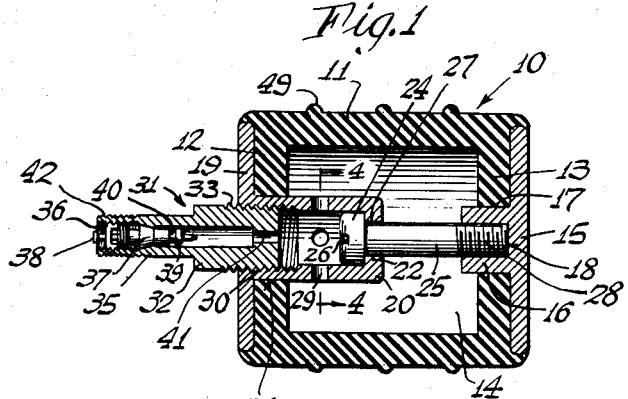
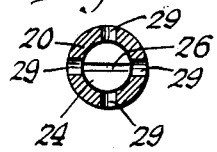
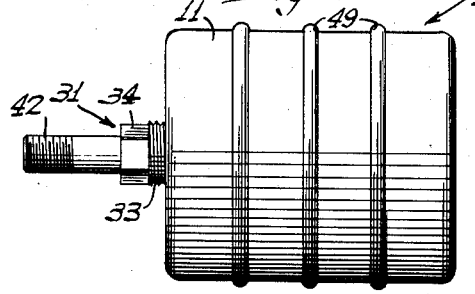
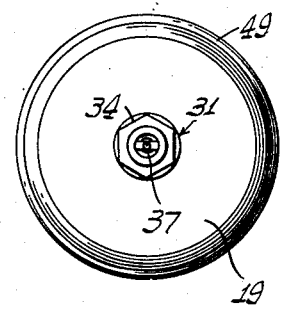
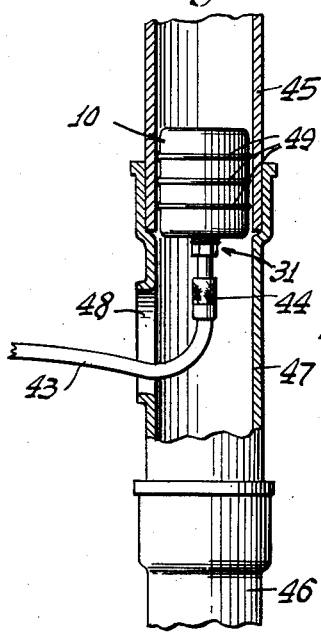
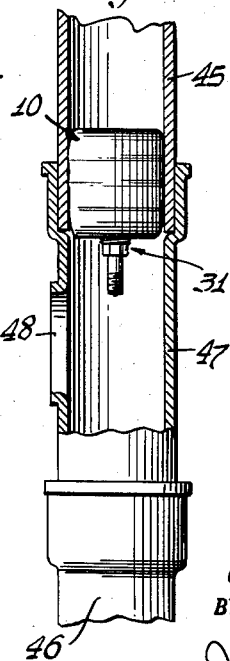
INVENTOR.
Oakley W. Hosking
BY
Johnson and Kline
ATTORNEYS

United States Patent Office 2,843,154
Patented July 15, 1958

2,843,154
EXPANSIBLE PLUG FOR PIPES

Oakley W. Hosking, Monroe, N. Y., assignor to Hosking Patent Corporation, New York, N. Y., a corporation of New York Application June 27, 1955, Serial No. 517,986

4 Claims. (Cl. 138—93)

This invention relates to an inflatable conduit stopper or expansion plug for pipes in which an inflatable element for stopping the flow of a fluid through a conduit is introduced in a deflated condition into the conduit or pipe and by creating and maintaining a pressure inside the chamber of the stopper, the resilient exterior side walls of the stopper expand and firmly grasp the inner wall of the pipe to effectively seal the same against the passage of a liquid or gas in the pipe.

An object of this invention is to produce an expansible pipe plug of the above type which is simple to use, economical to manufacture, made from only a few parts, and capable of withstanding severe usage.

Another object of this invention is to provide an inflatable conduit stopper in which the expansion of the inflatable member is limited almost wholly in a direction perpendicular to the pipe and elongation of the member along the axis of the pipe is prevented and may be adjustably controlled.

A further object is to produce an expansion plug which in its relaxed or non-inflated condition is cylindrical in shape, having resilient side walls and non-resilient ends with the ends being adjustably connected together, so that moving the ends closer together results in effectively increasing the diameter of the cylinder in order to frictionally maintain the plug in the pipe at the desired location prior to inflation.

Still another object of the invention is to provide an expansible plug for pipes which is so compact in design that it has universal utility and is capable for use in many locations in which prior plugs could not be employed and will effectively prevent leakage even with a larger amount of pipe pressure against the plug and with a minimum pressure in the plug chamber than heretofore possible.

The preferred embodiment of the invention as disclosed in the following description and drawings consists of an elongate cylindrical resilient member having relatively thick side walls and inwardly extending portions. Attached to the exterior surface of the end walls and of a diameter substantially equal to that of the cylinder are two non-resilient disks. These disks may be molded or bonded or cemented to the resilient member. Located within the interior of the cylinder is an adjustable interconnection between the two disks, the disks having inwardly projecting hub portions for cooperation with the interconnection. The hub on the front disk is tubular and has a threaded end portion into which is screwed a valve stem having a normally closed spring biased valve. Fluid pressure, preferably air, is introduced through the valve and passes through the valve stem into the tubular hub of the front cap and through a passageway therein to the hollow cylindrical chamber. This pressure acts in all directions on the resilient cylindrical member and forces or tends to expand the same both axially and radially. The axial expansion is prevented by the two disks and consequently only radial expansion, which is the desired expansion, is permitted.

It will thus be seen that a minimum amount of pressure creates a greater expansion in the direction perpendicular to the longitudinal axis of the cylindrical member and that this expansion is located over the effective entire length of the resilient member so that the outer surface tends to remain straight and unbowed in order to have maximum surface contact between the pipe and plug.

Also, in the preferred embodiment the interconnection between the two ends is adjustable and by decreasing the length therebetween the resilient member will bow outwardly and increase the diameter of the plug in its relaxed condition, that is, prior to inflation. This is accomplished by having the outside caps or disks of substantially the same diameter as the cylinder and consequently inward movement of them is transmitted directly to the side walls to buckle the same. Since the plug in its relaxed condition is a little smaller than the pipe, the effect of having a slight buckling effect is to provide a friction fit between the pipe and the plug so that the plug cannot fall down the pipe into which it is being inserted. Moreover this permits an adjustment to compensate for external wear of the resilient member.

Heretofore, in prior devices of the inflatable type used for plugging pipes for testing or to block the opening in order to prevent the flow of a fluid therein, the non-resilient end walls were of small diameter compared to the inflatable member, which necessitated that a greater pressure had to be maintained in the chamber to obtain the same sealing effect as my expansible plug, since the walls of the resilient member became arcuate or attempted to assume the shape of a circle in a plane parallel with the longitudinal axis, and that the full effective length of the plug was not pressed against the sides of the pipe. Furthermore, the use of small end caps enabled the resilient member to bow outwardly around the end caps, which bowing is undesirable since it performs no useful function. Also the prior devices were made using a very thin wall which increased their susceptibility to puncturing and prevented frictional placement of the plug in the pipe in the normal or deflated condition.

Other features will become more readily apparent from the following description and the accompanying illustrative drawing in which:

Figure 1 is a cross section through the axis of the expansible plug.

Fig. 2 is an elevational view of the device ready for use.

Fig. 3 is an end view as seen looking towards the right in Fig. 2.

Fig. 4 is a view on the line 4—4 of Fig. 1.

Fig. 5 is a view showing the expansible plug in a pipe prior to inflation, and

Fig. 6 shows an inflated plug in use and sealing the pipe.

While one embodiment of the invention is illustrated in the above referred to drawing, it is to be understood that it is merely for the purpose of illustration and that various changes in construction may be resorted to in the course of manufacture in order that the invention may be utilized to the best advantage according to circumstances which may arise, without in any way departing from the spirit and intention of the device which is to be limited only in accordance with the appended claims. And while there is stated the primary field of utility of the invention it remains obvious that it may be employed in any other capacity wherein it may be found applicable.

Referring to the drawing, reference numeral 10 indicates the test ball or expansible plug which has the shape of a cylinder with the longitudinal axis being greater than its diameter. This plug has an elongate, hollow, tubular body 11 formed of resilient material, such as rubber, with relatively thick walls. The body has a front end wall 12 which extends inwardly and also a rear end wall 13 extending inwardly so as to define the cylindrical chamber 14.

Attached to the exterior of the end wall 13 is a circular rear end reinforcing disk or cap 15 formed of non-resilient material, such as a metal, and in the actual manufacture brass is used for ease of machining. This cap 15 has a circular boss 16 extending into the chamber through an aperture 17 in the rear end wall 13 of the body. A threaded cavity 18 is axially aligned with the axis of the circular boss.

Positioned on the exterior surface of the front end wall 12 is a circular front end reinforcing cap or disk 19 having an inwardly extending hollow, cylindrical, tubular protuberance 20 which passes through an aperture 21 in the front end wall 12. The innermost end of this protuberance has axially directed flanged portions 22 for providing an abutment.

While the interconnection between the front and rear caps may consist of any number of mechanical expediences, in the preferred embodiment shown this member consists merely of a bolt 25 having a head 24 provided with a slot 26. The head 24 is positioned within the hollow protuberance 20. The head 24 is larger than the flanges 22 and consequently a positive stop or abutment is created.

The bolt 25 passes through an opening 27 formed by the flanges 22 and has a threaded end portion 28 for engagement with the cavity 18 of the rear end reinforcing disk. It will thus be apparent that turning movement of the bolt 25 can vary the distance between the front and rear end walls.

The tubular protuberance 20 has intermediate the ends thereof perforations 29 for conducting fluid to the chamber 14. The end of the protuberance 20 remote from the flange 22 has interior threads 30 for fluid-tight engagement wtih a hollow valve stem 31. The hollow valve stem 31 has an enlarged end portion 32 which has threads 33 on one portion for engagement with the inner threads 30. Adjacent the threads 33 there is formed a six-sided milled portion 34 in the shape of a hex nut to facilitate screwing the valve stem into the protuberance.

The reduced end portion 35 of the valve stem 31 is provided with inner threads 36 into which is positioned in threadable engagement the air valve 37. The air valve 37 has a spindle 38 attached to a disk 39 for creating an opening between the disk 39 and the seat 40 of the valve. The disk is normally spring biased into a closing position with the seat 40.

The hollow valve stem has a passageway of reduced diameter 41 extending into the protuberance 20 in order to form a path for the fluid to travel. The valve stem is also provided with an outer threaded portion 42 to facilitate an airtight engagement with the end of an air hose 43 having a connector 44. The air hose may be provided to any source of air pressure such as a pump or air tank (not shown).

While there are numerous ways of assembling the device such as by the use of cement or glue, in the preferred embodiment the tubular body is formed of partially cured rubber and the end caps 15 and 19, together with the bolt 25, are attached thereto. Then the body 11 is completely cured and this effectuates a seal between the caps and the body in order that the chamber 14 will be airtight.

As shown in Figs. 5 and 6 the device is shown as being used for testing a length of pipe or for sealing the pipe. The length of pipe 45 is connected to the pipe 46 by an intermediate length of pipe 47 which may be a Y or, as shown, is of the T type having an opening 48. The pipe shown is of the soil type but it is obvious that the invention may be used with other pipes. In Fig. 5 the expansible plug 10 is shown inserted in the pipe in a relaxed condition with the air hose 43 attached thereto. After introduction of pressure into the chamber 14 the plug assumes the expanded condition shown in Fig. 6 and effectively seals the pipe. It should be noted that the plug assumes a substantially cylindrical shape in the expanded condition. Moreover the plurality of ridges 49 formed on the exterior of the body member aid in providing a positive seal.

It is to be understood that the plug will be made in various sizes in order to fit various standard diameter pipes.

From the foregoing specification it will become apparent that the invention disclosed will adequately accomplish the functions for which it has been designed and in an economical manner, and that its simplicity, accuracy and ease of operation are such as to provide a relatively inexpensive device considering what it will accomplish, and that it will find an important place in the art to which it pertains when once placed on the market.

Changes in shape, size and rearrangement of details and parts such as come within the purview of the invention claimed may be resorted to in actual practice, if desired.

I claim:

1. An expansible plug for tubular conduits comprising an elongate hollow tubular body of resilient material, reinforcing non-resilient end caps attached to the ends of the body and forming therewith a chamber, one of said end caps including a tubular projection having an interiorly threaded portion and an aperture communicating with said chamber, valve means for enabling fluid pressure to be introduced and maintained in said chamber, said valve means including a hollow stem threadable into the interiorly threaded portion of said tubular projection, a normally closed spring biased valve stem positioned within said hollow stem, said hollow stem communicating with the aperture in said tubular projection, and a telescoping interconnection between said end caps for preventing longitudinal expansion of said resilient body when said body is subjected to fluid pressure whereby said plug transversely expands and firmly grips the conduit to provide a tight seal therewith.

2. An expansible plug for tubular conduits comprising an elongate hollow tubular body of resilient material, reinforcing non-resilient end caps attached to the ends of the body and forming therewith a fluid tight chamber, one of said end caps including an aperture communicating with said chamber, valve means connected to said one end cap and including a passageway having a valve stem therein communicating with the aperture for enabling fluid pressure to be introduced and maintained in said chamber, said end caps having integral projections extending into said chamber, a member secured to one projection and slidingly telescopingly received within the other projection, and cooperating means between said member and other projection for limiting the expanding movement of said end caps for preventing longitudinal expansion of said resilient body and for enabling longitudinal movement of the end caps toward each other when said body is subjected to fluid pressure within the chamber whereby said plug may longitudinally contract, transversely expand and firmly grip the conduit to provide a tight seal therewith.

3. An expansible plug for tubular conduits comprising an elongate hollow tubular body of resilient material, reinforcing non-resilient end caps attached to the ends of the body and forming therewith a fluid tight chamber, one of said end caps including an aperture communicating with said chamber, valve means connected to said one end cap and including a passageway having a valve stem therein communicating with the aperture for enabling fluid pressure to be introduced and maintained in said chamber, one of said end caps having a projection with a threaded axial opening extending into said chamber, the other of said caps having a tubular projection extending into said chamber and an axially directed flange formed on the end of the tubular projection within the chamber, a bolt having a head positioned within said projection and abutting said flange, and a threaded tail portion cooperating with said threaded opening for preventing longitudinal expansion of said resilient body and for enabling longitudinal movement of the end caps toward each other when said body is subjected to fluid pressure within the chamber whereby said plug transversely expands and firmly grips the conduit to provide a tight seal therewith.

4. An expansible plug for tubular conduits comprising an elongate hollow tubular body of resilient material having a periphery in its relaxed condition slightly less than the inner periphery of the conduit, said body having the shape of a closed cylinder with relatively thick side and end walls, reinforcing non-resilient end caps of a diameter substantially equal to the diameter of the relaxed body molded to each of the exterior end walls of the body and forming therewith a fluid tight chamber, valve means for enabling fluid pressure to be introduced and maintained in said chamber, one of said caps having a projection with a threaded axial opening formed therein extending into said chamber, the other of said caps having a tubular projection extending into said chamber and an inwardly axially directed flange formed on the end of the tubular projection within the chamber, a bolt having a head positioned within said projection and abutting said flange, said bolt having a shank portion in sliding engagement with said flange, and a threaded tail portion cooperating with said threaded opening for preventing longitudinal expansion of said resilient body when said body is subjected to fluid pressure whereby said plug transversely expands and firmly grips the conduit to provide a tight seal therewith, said tubular projection having radial apertures and a portion thereof remote from the flange being interiorly threaded, said valve means including a hollow stem threaded into the interiorly threaded portion and a normally closed valve stem positioned within the stem.

References Cited in the file of this patent

UNITED STATES PATENTS

| | | |
|---|---|---|
| 620,520 | Welstead | Feb. 28, 1899 |
| 1,077,352 | Kemp et al. | Nov. 4, 1912 |
| 1,906,151 | Goodman | Apr. 25, 1933 |
| 2,299,116 | Svirsky | Oct. 20, 1942 |
| 2,474,047 | Gorzkowski | June 21, 1949 |

FOREIGN PATENTS

| | | |
|---|---|---|
| 14,942 | Great Britain | Aug. 8, 1895 |
| 513,225 | Great Britain | Oct. 6, 1939 |